(12) United States Patent
Rabe et al.

(10) Patent No.: US 9,729,403 B1
(45) Date of Patent: Aug. 8, 2017

(54) PROFICIENCY-BASED GUI ADAPTATION

(71) Applicant: EMC Corporation, Hopkinton, MA (US)

(72) Inventors: Bruce R. Rabe, Dedham, MA (US); Kendra Marchant, Arlington, MA (US); Rhon L. Porter, South Grafton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 686 days.

(21) Appl. No.: 13/833,356

(22) Filed: Mar. 15, 2013

(51) Int. Cl.
  G06F 3/048    (2013.01)
  H04L 12/24    (2006.01)
  G06F 3/0489   (2013.01)
  G06F 9/44     (2006.01)
  G06F 9/445    (2006.01)
  G06F 3/0481   (2013.01)

(52) U.S. Cl.
  CPC .......... H04L 41/22 (2013.01); G06F 3/04895 (2013.01); *G06F 3/0481* (2013.01); *G06F 9/4443* (2013.01); *G06F 9/44505* (2013.01)

(58) Field of Classification Search
  CPC .. G06F 9/4443; G06F 3/04895; G06F 3/0481; G06F 9/44505; H04L 41/22
  USPC .................................................. 715/744, 707
  See application file for complete search history.

(56) References Cited

U.S. PATENT DOCUMENTS

| | | | |
|---|---|---|---|
| 7,620,894 B1 * | 11/2009 | Kahn ........................... | 715/707 |
| 8,326,882 B1 | 12/2012 | Desai et al. | |
| 8,533,604 B1 * | 9/2013 | Parenti et al. ................ | 715/743 |
| 8,631,330 B1 * | 1/2014 | Hwang et al. ................ | 715/736 |
| 8,732,662 B1 * | 5/2014 | Savant ......................... | 717/120 |
| 8,954,880 B1 | 2/2015 | Rabe et al. | |
| 2004/0233235 A1 * | 11/2004 | Rubin et al. .................. | 345/738 |
| 2009/0311657 A1 * | 12/2009 | Dodelson et al. ............ | 434/350 |
| 2011/0154216 A1 * | 6/2011 | Aritsuka et al. .............. | 715/745 |

OTHER PUBLICATIONS

Bruce R. Rabe, et al., "Automatic Layout of Graphical User Interface Screens From Object Data", U.S. Appl. No. 13/799,547, filed Mar. 13, 2013.
Scott E. Joyce, et al., "Custom Help Systems by Runtime Modification of Generic Help Files", U.S. Appl. No. 13/834,465, filed Mar. 15, 2013.
Norman M. Miles, et al., "Adaptive GUI Pre-Fetching", U.S. Appl. No. 13/837,707, filed Mar. 15, 2013.

\* cited by examiner

*Primary Examiner* — Patrick Riegler
*Assistant Examiner* — Alex Olshannikov
(74) *Attorney, Agent, or Firm* — BainwoodHuang

(57) ABSTRACT

One embodiment is directed to a method performed by a computing device. The method includes (1) receiving a command from a user to display a current GUI page of a set of GUI pages on a client device, the set of GUI pages providing the user with control over a system, (2) selecting, with reference to a proficiency level associated with the user, a version of the current GUI page from a plurality of versions of the current GUI page, and (3) causing the selected version of the current GUI page to be displayed to the user on a display of the client device. Other embodiments are directed to a computerized apparatus and a computer program product for performing a method similar to that described above.

17 Claims, 4 Drawing Sheets

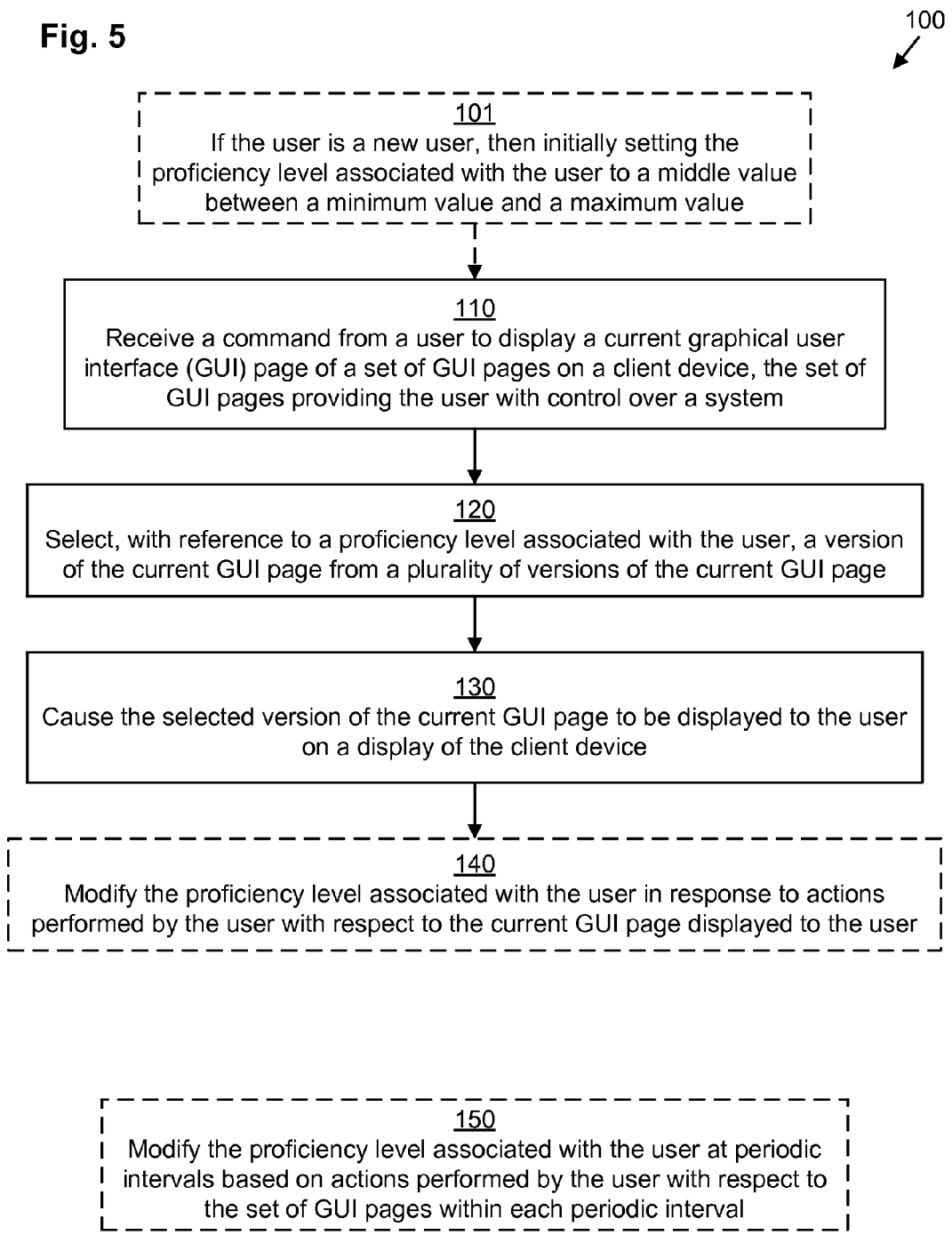

PROFICIENCY-BASED GUI ADAPTATION

BACKGROUND

Management graphical user interfaces (GUIs) allow users to manage systems using on-screen graphical tools, often from locations remote from the systems being managed. A management GUI typically includes many different management GUI pages, which are displayed to a user in various sequences as the user attempts to perform various system management tasks.

Depending on the system being managed, some pages of the management GUI may be rather complex. Displaying a full set of features may cause novice users to shy away from a system, while omitting too many features may upset advanced users. Some conventional systems allow certain advanced features to be hidden by default, the advanced user being able to access the advanced feature by clicking on a link that un-hides the advanced features.

SUMMARY

The above-described conventional system for compromising between novice and advanced users by hiding advanced features suffers from deficiencies. For example, advanced users may become annoyed by continuously needing to unhide advanced features, while novice users may still become confused.

Thus, it would be desirable to alleviate these concerns by configuring a system to adaptively adjust the display of GUI pages based on a proficiency level of a user. Thus, embodiments are directed to techniques for adaptively displaying a GUI according to a user proficiency level gleaned from historical usage patterns.

One embodiment is directed to a method performed by a computing device. The method includes (1) receiving a command from a user to display a current GUI page of a set of GUI pages on a client device, the set of GUI pages providing the user with control over a system, (2) selecting, with reference to a proficiency level associated with the user, a version of the current GUI page from a plurality of versions of the current GUI page, and (3) causing the selected version of the current GUI page to be displayed to the user on a display of the client device. Other embodiments are directed to a computerized apparatus and a computer program product for performing a method similar to that described above.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 5 depicts an example method according to various embodiments.

DETAILED DESCRIPTION

Embodiments are directed to techniques for adaptively displaying a GUI according to a user proficiency level gleaned from historical usage patterns.

Figure 1:
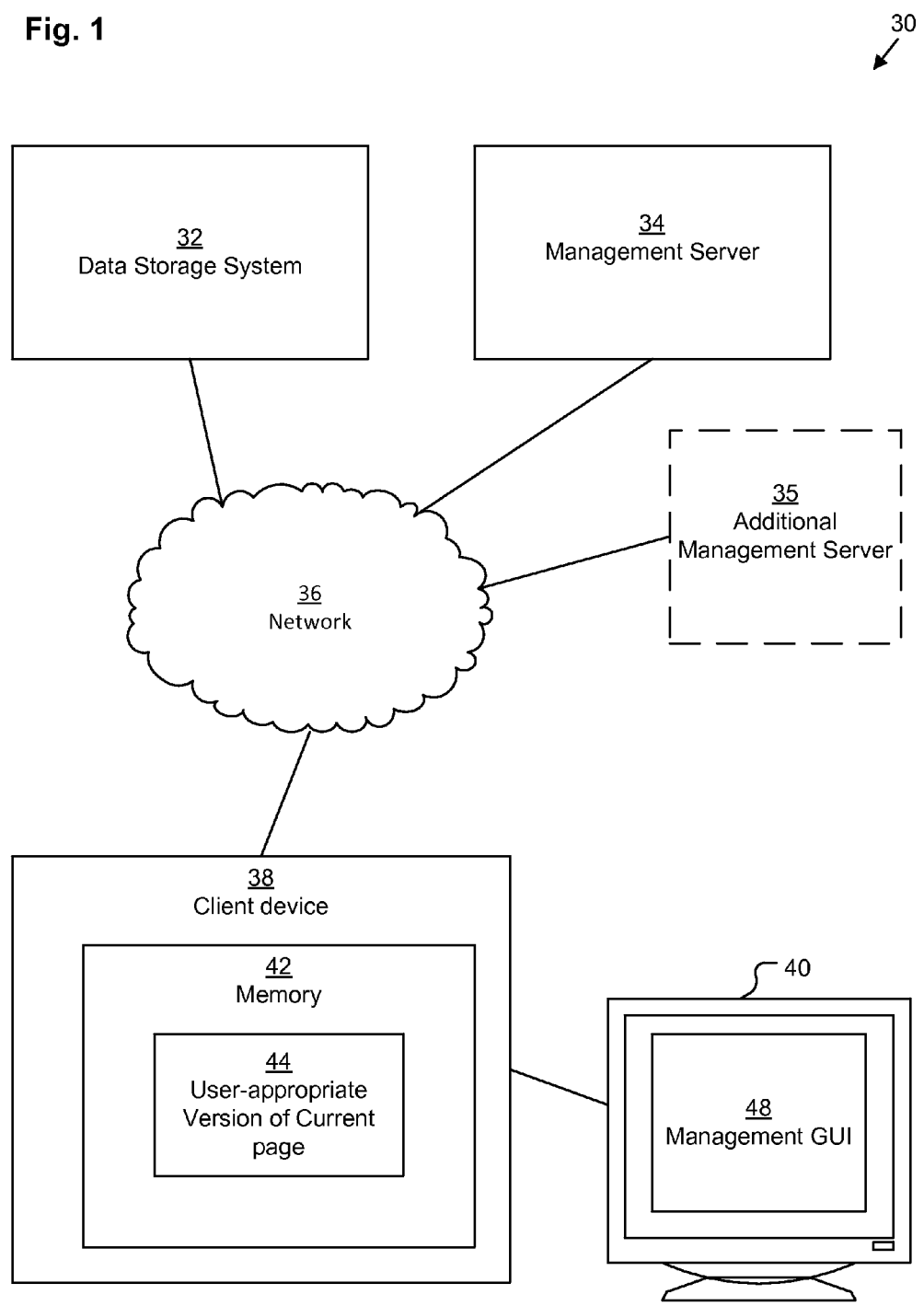
FIG. 1 depicts an example system for use in performing various embodiments.

FIG. 1 depicts an example system 30. System 30 includes a data storage system 32, such as, for example, a NAS data storage system, which provides access to one or more filesystems stored thereon, or a SAN data storage system, which provides block-based access to one or more volumes stored thereon. In some embodiments, data storage system 32 provides both block-based access to logical volumes as well as file-based access to filesystems. In some embodiments, instead of including a data storage system 32, system 30 includes another kind of system to be managed by a user.

System 30 also includes a management server 34. Management server 34 may store a management GUI for use in managing data storage system 32 or some other system requiring management. In some embodiments, system 30 may also include one or more additional management servers 35 which may also be used to store the management GUI for use in managing data storage system 32.

System 30 also includes a client device 38 connected to data storage system 32 and management server 34 via a network 36. Network 36 may be any kind of network, such as, for example, a local area network, a wide area network, the Internet, a storage area network, a fabric of interconnected hubs and switches, etc. In some embodiments, in lieu of a network, direct point-to-point connections may be used.

Client device 38, management server 34, and additional management servers 35 may be any kind of computing devices, such as, for example, a personal computer, a workstation, a server, an enterprise server, a laptop computer, a mobile computer, a smart phone, a tablet computer, etc., although typically, management server 34 and additional management servers 35 are servers or enterprise servers.

A user operates client device 38 in order to display a management GUI 48 on a display device 40 connected to the client device 38 for managing the data storage system 32. Client device 38 stores a user-appropriate version 44 of a current page of the management GUI within memory 42, which is displayed on display 40 within management GUI 48.

In some embodiments, the management GUI may be stored entirely within persistent storage of the client device 38 rather than within the management server 34; in such embodiments, the management server 34 and the client device 38 are effectively conflated into a single device.

Display device 40 may be any kind of display device capable of displaying a GUI, such as, for example, a monitor, a television, a cathode ray tube, a liquid crystal display, a plasma display, a light emitting diode display, a touch-sensitive display screen, etc.

Figure 2:
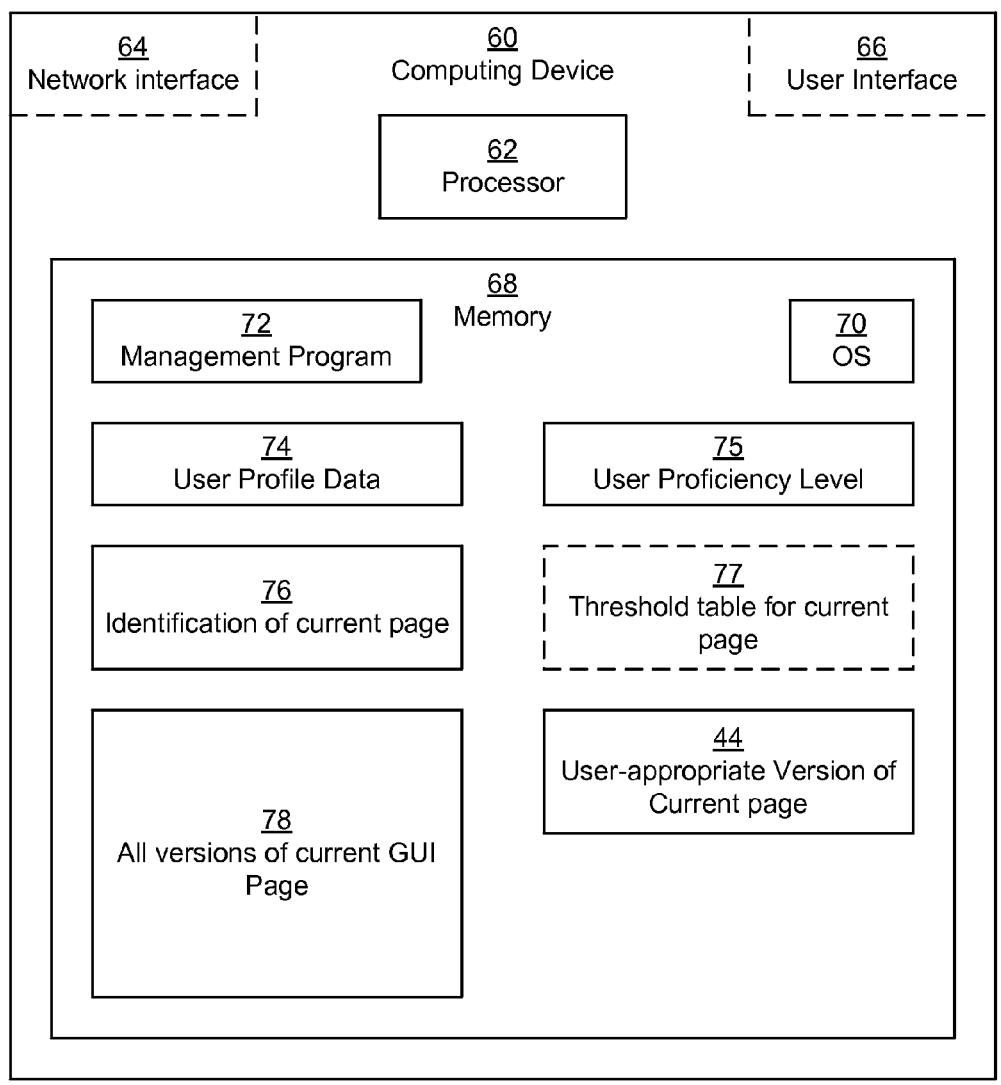
FIG. 2 depicts an example apparatus according to various embodiments.

FIG. 2 depicts an example computing device 60 in which a method is performed as described in further detail below in connection with FIG. 5. Since in some embodiments the method of claim 5 may be performed in client device 38, while in other embodiments the method of claim 5 may be performed in management server 34, computing device 60 may be either client device 38 or management server 34, depending on the embodiment.

Computing device 60 includes a processor 62. Processor 62 may be any kind of processor or set of processors configured to perform operations, such as, for example, a microprocessor, a multi-core microprocessor, a digital signal processor, a collection of electronic circuits, or any combination of the above. Computing device 60 also includes a network interface 64 for interfacing with network 36. When computing device 60 is the client device 38, it also includes a user interface 66 for interfacing with display 40 and user input devices (not depicted).

Computing device 60 also includes memory 68. Memory 68 may be any kind of digital system memory, such as, for example, RAM. Memory 68 stores programs executing on processor 62 as well as data used by those programs. Memory 68 stores an operating system (OS) 70 and a management program 72, both of which run on processor 62. Memory 68 may include both a system memory portion for storing programs and data in active use by the processor 62 as well as a persistent storage portion (e.g., solid-state storage and/or disk-based storage) for storing programs and data even while the computing device 60 is powered off. OS 70 and management program 72 are typically stored both in system memory and in persistent storage so that they may be loaded into system memory from persistent storage upon a system restart. Management program 72, when stored in non-transient form either in system memory or in persistent storage, forms a computer program product. The processor 62 running the management program 72 thus forms a specialized circuit constructed and arranged to carry out the various processes described herein.

Memory 68 also stores user profile data 74 and a user proficiency level 75 for a particular user. Memory 68 also stores an identification of the current page of the management GUI that the user has navigated to as well as the user-appropriate version 44 of the current page identified by identification 76. Memory 68 also stores the entire set 78 of GUI pages as well (typically in lower-speed persistent storage rather than in RAM) as any associated data needed by those GUI pages.

In some embodiments, memory 68 also stores a threshold table 77 for the current page, which identifies specific versions (or specific modifications to) the current page and what user proficiency level 75 thresholds indicate when one version or modification is used versus another. For example, if there are ten possible user proficiency levels ranging from 1 (extreme novice) to 10 (extremely advanced user) and three different versions (e.g., basic, intermediate, and advanced) of particular page the threshold table 77 for that page might indicate that the basic version is used up through level 4, the intermediate version between levels 5 and 8, and the advanced version at levels 9 and above. It should be noted that various threshold tables 77 may be stored in memory 68—one for each page although in some embodiments, there is only a single threshold table 77 which is the same for all pages.

Figure 3:
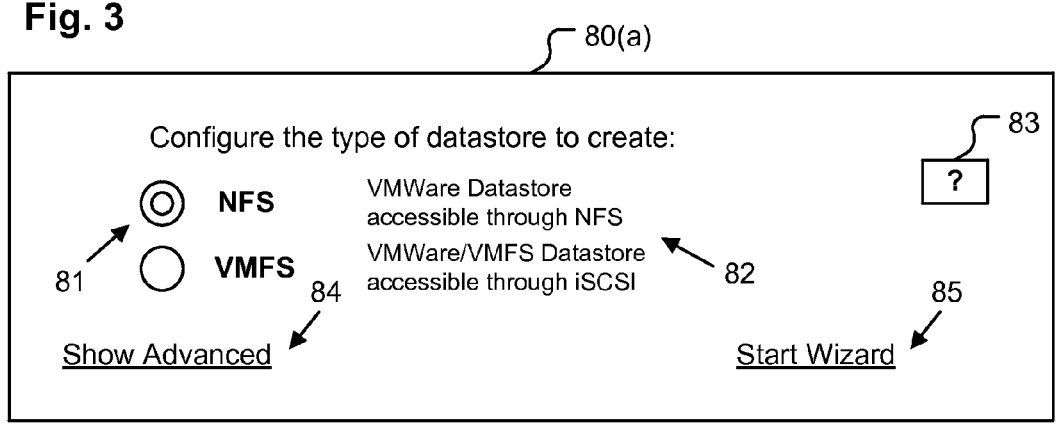
FIG. 3 depicts an example GUI page displayed according to various embodiments.

FIG. 3 depicts an example novice version 80(*a*) of a GUI page for creating a datastore as it may be rendered on display 40. At its core, the GUI page directs the user what to do ("Configure the type of datastore to create:") and provides a set of radio buttons 81 for the user to choose between NFS and VMFS. The novice version 80(*a*) also typically provides a help link 83 and a link 85 to open a wizard to guide the user through the configuration process. In the most novice version 80(*a*), also displayed are helpful hints 82 that describe the various choices in a concise manner. In some embodiments, the most novice version 80(*a*) omits an advanced link 84 to allow the user to display more advanced configuration options, while in other embodiments the advanced link 84 is present even in the most novice versions. In some slightly more advanced (intermediate) versions, the helpful hints 82 may be omitted.

Figure 4:
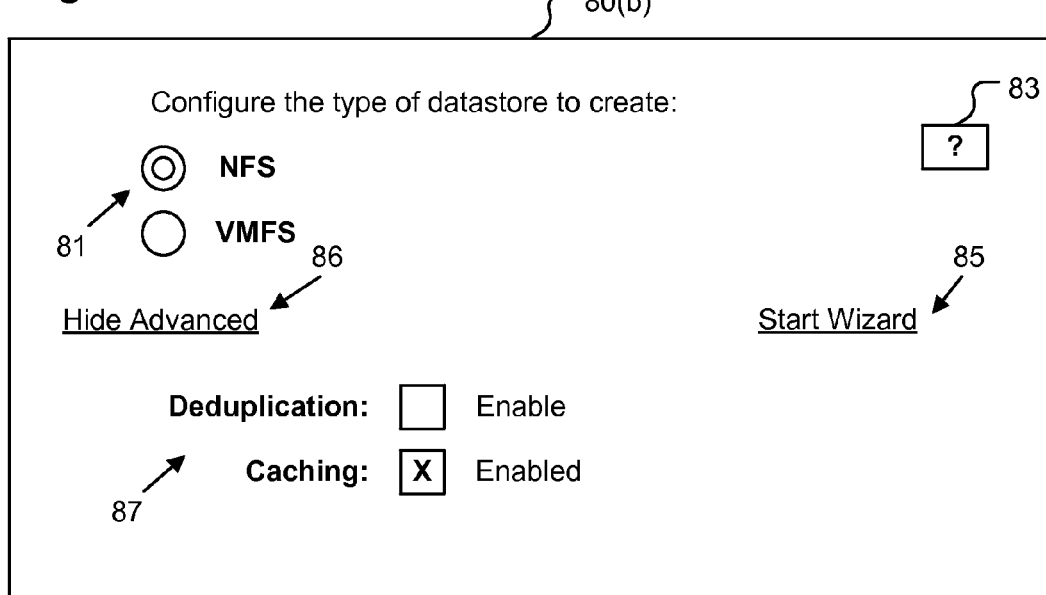
FIG. 4 depicts another example GUI page displayed according to various embodiments.

FIG. 4 depicts an example advanced version 80(*b*) of a GUI page for creating a datastore as it may be rendered on display 40. The GUI page contains the same core features as above (e.g., directions and radio buttons 81). Typically, even in the most advanced version 80(*b*), help link 83 and wizard link 85 are also present, although in some embodiments these features may be omitted in the most advanced version 80(*b*). However, there are no helpful hints 82 and advanced configuration options 87 are displayed. The advanced link 84 is replaced by a link 86 that hides the advanced configuration options 87 (if clicked, the advanced link 84 returns in place of link 84 and advanced configuration options 87).

FIG. 5 illustrates, as method 100, the operation of management program 72 on computing device 60 for adaptively displaying a GUI according to a user proficiency level gleaned from historical usage patterns according to various embodiments. It should be understood that any time a piece of software, such as, for example, management program 72, is described as performing a method, process, step, or function, in actuality what is meant is that a computing device (e.g., computing device 60) on which that piece of software is running performs the method, process, step, or function when executing that piece of software on its processor (e.g., processor 62). It should also be understood that, in some embodiments, instead of processor 62 executing code of management program 72, specialized circuitry of the computing device 60 operates to perform the method, process, step, or function directly in hardware.

In optional step 101, when a new user first creates an account and begins to operate management GUI 48, management program 72 initially sets the user's proficiency level 75 to an intermediate value (e.g., 5 on a scale from 1 to 10). This allows the user to initially see the most commonly-used options and to have the opportunity to easily locate more advanced options by clicking on various advanced links 84 and advanced tabs (not depicted).

In step 110, computing device 60 receives a command from a user to display a current GUI page on client device 38 within management GUI 48 on display 40. The management GUI 48 provides the user with control over data storage system 32 (or another kind of system) via the set of GUI pages 78. The command causes the identification 76 of the current GUI page to be updated.

In step 120, management program 72 selects, with reference to the user's proficiency level 75 (and, in some embodiments, the threshold table 77), a version of the current GUI page identified by identification 76 to be generated and stored within memory as the user-appropriate version 44 of the current GUI page.

In some embodiments, there are only two proficiency levels 75—novice and advanced. In such embodiments, there is no need for threshold table 77 because every GUI page displays a novice version when the proficiency level 75 is set to novice and an advanced version when the proficiency level 75 is set to advanced.

In other embodiments, there may be more than two proficiency levels 75, but not all pages (and indeed, in some embodiments, almost no pages) will have a different version for every possible proficiency level 75. In such embodiments, the threshold table 77 is used to establish which versions of the current page are used at which proficiency levels 75.

In some embodiments, the proficiency level 75 stored in memory is determinative of the actual proficiency level used in making the selection of step 120. However, in certain embodiments that is not the case. In some embodiments, when the computing device 60 is the client device 32, management program 72 may obtain a different proficiency level stored on the management server 34 and then select between the value obtained from the management server 34 and the locally-stored version. For example, in one embodiment, management program 72 chooses whichever proficiency level is higher.

In some embodiments, when the computing device 60 is the management server 34, management program 72 may obtain a different proficiency level stored on one or more of the additional management servers 35 and then select between the values obtained from the additional management servers 35 and the locally-stored version. For example, in one embodiment, management program 72 chooses whichever proficiency level is lower.

In step 130, the management program 72 causes the user-appropriate version 44 of the current GUI page to be displayed to the user on display 40 of the client device 32.

In embodiments in which the client device 38 is the computing device 60, step 130 is typically performed by management program 72 rendering user-appropriate version 44 of the current GUI page into the video buffer.

In embodiments in which the management server 34 is the computing device 60 distinct from client device 38, step 130 is performed by management program 72 sending the user-appropriate version 44 of the current GUI page to client device 38 for display on display 40.

In optional step 140, actions that a user takes while accessing the user-appropriate version 44 of the current GUI page may influence the user proficiency level 75. Thus, certain actions, such as clicking on an advanced link 84 or tab or actually modifying an advanced configuration option 87 will tend to raise the user proficiency level 75. For example, if the user proficiency level 75 is an integer on a scale from 1 to 100, then clicking on an advanced link 84 or tab might immediately raise the user proficiency level 75 by one point (e.g., from 50 to 51), while modifying an advanced configuration option 87 might immediately raise the user proficiency level 75 by two points (e.g., from 51 to 53).

Certain other actions, such as clicking on a "hide advanced" link 86, a help link 83, or a wizard link 85, will tend to lower the user proficiency level 75. For example, if the user proficiency level 75 is an integer on a scale from 1 to 100, then clicking on a "hide advanced" link 86 might immediately lower the user proficiency level 75 by one point (e.g., from 53 to 52), while clicking on a help link 83 or a wizard link 85 might immediately lower the user proficiency level 75 by two points (e.g., from 52 to 49).

In optional step 150, which is performed periodically when step 140 is not included in method 100, management program 72 periodically updates the user proficiency level 75 at regular intervals (e.g., every one hour of active use of the management GUI 48) based on user actions taken since the last update. The management program 72 may store actions taken in the previous interval within memory 68 in user profile data 74 and make reference to the user profile data 74 in deciding how to update the user proficiency level 75. The same sorts of actions that raise the user proficiency level 75 in step 140 also tend to raise the user proficiency level 75 in step 150, while the same sorts of actions that lower the user proficiency level 75 in step 140 also tend to lower the user proficiency level 75 in step 150. Thus, if the user proficiency level 75 is measured on an integer scale from 1 to 10, and in the past hour of use, the user has clicked on 17 help links 83, 5 wizard links 85 and only 2 advanced links 84, the management program 72 may reduce the user's user proficiency level 75 by 2 points (e.g, from 7 to 5), while if in the past hour of use, the user has clicked on 33 advanced links 84, 2 wizard links 85 and made 11 changes to advanced configuration options 87, the management program 72 may increase the user's user proficiency level 75 by 3 points (e.g, from 5 to 8).

Thus, techniques have been described for adaptively displaying a GUI according to a user proficiency level 75 gleaned from historical usage patterns.

While various embodiments of the present disclosure have been particularly shown and described, it will be understood by those skilled in the art that various changes in form and details may be made therein without departing from the spirit and scope of the present disclosure as defined by the appended claims.

For example, although various embodiments have been described as being methods, software embodying these methods is also included. Thus, one embodiment includes a tangible non-transient computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "conventional," Applicants make no admission that such technique, method, apparatus, or other concept is actually prior art under 35 U.S.C. §102, such determination being a legal determination that depends upon many factors, not all of which are known to Applicants at this time.

What is claimed is:

1. A method performed by a computing device, the method comprising:
  receiving a command from a user to display a current graphical user interface (GUI) page of a set of GUI pages on a client device, the set of GUI pages providing the user with control over a system;
  selecting, with reference to a proficiency level associated with the user, a version of the current GUI page from a plurality of versions of the current GUI page; and
  causing the selected version of the current GUI page to be displayed to the user on a display of the client device;
wherein:
  the client device is the computing device;
  receiving the command is performed by the client device receiving a user input signal via user interface device;
  causing the selected version of the current GUI page to be displayed to the user includes sending the selected version of the current GUI page to the display of the client computer via a display interface; and
  selecting includes:
    reading the proficiency level associated with the user from local storage of the client device;
    obtaining another proficiency level associated with the user from a remote server over a network connection; and
    selecting between the proficiency level associated with the user read from the local storage of the client device and the other proficiency level associated with the user obtained from the remote server, wherein selecting between the proficiency level associated with the user read from the local storage of the client device and the other proficiency level associated with the user obtained from the remote server includes selecting whichever of the proficiency level associated with the user read from the local storage of the client device and the other proficiency level associated with the user obtained from the remote server is higher.

2. The method of claim 1 wherein the method further comprises, modifying the proficiency level associated with the user in response to actions performed by the user with respect to the current GUI page displayed to the user.

3. The method of claim 2 wherein modifying the proficiency level includes raising the proficiency level in response to the user clicking on advanced settings links.

4. The method of claim 2 wherein modifying the proficiency level includes lowering the proficiency level in response to the user clicking on help links.

5. The method of claim 2 wherein modifying the proficiency level includes lowering the proficiency level in response to the user activating guided configuration wizards.

6. The method of claim 1 wherein the proficiency level is selected from a novice level and an advanced level and selecting further includes:
selecting a novice version of the current GUI page when the proficiency level is at the novice level; and
selecting an advanced version of the current GUI page when the proficiency level is at the advanced level.

7. The method of claim 6 wherein the advanced version of the current GUI page differs from the novice version of the current GUI page by including an additional selectable object, which, when selected by the user causes additional configuration options to be displayed to the user.

8. The method of claim 6 wherein the advanced version of the current GUI page differs from the novice version of the current GUI page by including additional configuration options displayed to the user.

9. The method of claim 1 wherein the proficiency level is selected from at least three values ranging from a minimum value to a maximum value and selecting includes selecting a version of the current GUI page associated with a range of values that includes the proficiency level associated with the user.

10. The method of claim 9 wherein, the method further includes, if the user is a new user, then initially setting the proficiency level associated with the user to a middle value between the minimum value and the maximum value.

11. The method of claim 10 wherein the method further comprises modifying the proficiency level associated with the user at periodic intervals based on actions performed by the user with respect to the set of GUI pages within each periodic interval.

12. The method of claim 1 wherein the system is a data storage system and the set of GUI pages provides the user with control over a configuration of elements of the data storage system.

13. The method of claim 1 wherein:
the computing device stores a threshold table for the current GUI page, the threshold table for the current GUI page identifying particular versions of the current GUI page from the plurality of versions of the current GUI page associated with particular possible proficiency levels; and selecting, with reference to the proficiency level associated with the user, the version of the current GUI page from the plurality of versions of the current GUI page includes selecting the version of the current GUI page identified by the threshold table as associated with the proficiency level associated with the user.

14. The method of claim 1 wherein:
the proficiency level associated with the user from local storage is mapped to a first version of the current GUI page of the plurality of versions of the current GUI page;
the other proficiency level associated with the user obtained from the remote server is mapped to a second version of the current GUI page of the plurality of versions of the current GUI page, the second version being different than the first version; and
selecting further includes choosing between the first version of the current GUI page and the second version of the current GUI page depending whether the proficiency level or the other proficiency level is selected.

15. An apparatus comprising:
memory, the memory storing:
a set of graphical user interface (GUI) pages which provide a user with control over a system; and
a proficiency level associated with the user;
a user interface device;
a display interface for communicating with a display device;
local storage;
a network connection for connecting to a remote server; and
a processor, the processor being configured to:
receive a command from the user to display a current GUI page of the set of GUI pages on the display;
select, with reference to the proficiency level associated with the user, a version of the current GUI page from a plurality of versions of the current GUI page;
cause the selected version of the current GUI page to be displayed to the user on the display;
wherein:
receiving the command is performed by receiving a user input signal via the user interface device;
causing the selected version of the current GUI page to be displayed to the user includes sending the selected version of the current GUI page to the display via the display interface; and
selecting includes:
reading the proficiency level associated with the user from the local storage;
obtaining another proficiency level associated with the user from the remote server over the network connection; and
selecting between the proficiency level associated with the user read from the local storage and the other proficiency level associated with the user obtained from the remote server, wherein selecting between the proficiency level associated with the user read from the local storage and the other proficiency level associated with the user obtained from the remote server includes selecting whichever of the proficiency level associated with the user read from the local storage and the other proficiency level associated with the user obtained from the remote server is higher.

16. The apparatus of claim 15 wherein:
the memory further stores a threshold table for the current GUI page, the threshold table for the current GUI page identifying particular versions of the current GUI page from the plurality of versions of the current GUI page associated with particular possible proficiency levels; and selecting, with reference to the proficiency level associated with the user, the version of the current GUI page from the plurality of versions of the current GUI page includes selecting the version of the current GUI page identified by the threshold table as associated with the proficiency level associated with the user.

17. A computer program product comprising a non-transitory computer-readable storage medium storing a set of instructions, which, when executed by a computer causes the computer to perform the operations of:

receiving a command from a user to display a current graphical user interface (GUI) page of a set of GUI pages on local display, the set of GUI pages providing the user with control over a system;

selecting, with reference to a proficiency level associated with the user, a version of the current GUI page from a plurality of versions of the current GUI page; and causing the selected version of the current GUI page to be displayed to the user on the local display;

wherein:

receiving the command is performed by receiving a user input signal via a user interface device;

causing the selected version of the current GUI page to be displayed to the user includes sending the selected version of the current GUI page to the local display via a display interface; and selecting includes:

reading the proficiency level associated with the user from local storage;

obtaining another proficiency level associated with the user from a remote server over a network connection; and selecting between the proficiency level associated with the user read from the local storage and the other proficiency level associated with the user obtained from the remote server, wherein selecting between the proficiency level associated with the user read from the local storage and the other proficiency level associated with the user obtained from the remote server includes selecting whichever of the proficiency level associated with the user read from the local storage and the other proficiency level associated with the user obtained from the remote server is higher.

* * * * *